United States Patent
Wei et al.

(10) Patent No.: US 8,009,357 B2
(45) Date of Patent: Aug. 30, 2011

(54) IMAGE SCREEN

(75) Inventors: Chao-Tsang Wei, Taipei (TW);
Chun-Chuan Lin, Hsinchu (TW);
Rung-Ywan Tsai, Taipei (TW);
Hua-Ying Sheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 314 days.

(21) Appl. No.: 12/024,120

(22) Filed: Feb. 1, 2008

(65) Prior Publication Data

US 2009/0116113 A1 May 7, 2009

(30) Foreign Application Priority Data

Nov. 6, 2007 (TW) .............................. 96141844 A

(51) Int. Cl.
*G02B 1/10* (2006.01)

(52) U.S. Cl. .................... 359/585; 359/584; 359/586

(58) Field of Classification Search .................. 359/586, 359/584, 585
See application file for complete search history.

(56) References Cited

U.S. PATENT DOCUMENTS

| | | | |
|---|---|---|---|
| 2005/0207007 A1 | 9/2005 | Shimoda et al. | |
| 2005/0225687 A1* | 10/2005 | Yamauchi | 349/5 |
| 2005/0231800 A1 | 10/2005 | Lippey | |
| 2006/0050188 A1* | 3/2006 | Miyaki et al. | 349/5 |
| 2007/0014004 A1* | 1/2007 | Wood | 359/449 |

FOREIGN PATENT DOCUMENTS

| | | |
|---|---|---|
| EP | 1630596 | 3/2006 |
| JP | 2005-84187 | 3/2005 |

OTHER PUBLICATIONS

"1st Office Action of China counterpart application", issued on Jan. 8, 2010, p. 1-p. 6.

* cited by examiner

*Primary Examiner* — Joshua L Pritchett
(74) *Attorney, Agent, or Firm* — Jianq Chyun IP Office

(57) ABSTRACT

An image screen includes a transparent substrate, a metal film, and an optical reflective stack layer. The metal film is disposed on a first surface of the transparent substrate, having a thickness and a set of material characteristic constants being predetermined. The optical reflective stack layer is disposed over the metal layer. The metal film and the optical reflective stack layer function together to selectively reflect a light with a portion of wavelength. In addition, according to the need, a diffusion micro-structure layer can be disposed on a second surface of the transparent substrate. Further for example, another reflective layer or optical absorbing layer can be further disposed on another surface of the optical reflective stack layer. The reflective layer can be, for example, a metal film.

20 Claims, 4 Drawing Sheets

IMAGE SCREEN

CROSS-REFERENCE TO RELATED APPLICATION

This application claims the priority benefit of Taiwan application serial no. 96141844, filed on Nov. 6, 2007. The entirety of the above-mentioned patent application is hereby incorporated by reference herein and made a part of this specification.

BACKGROUND OF THE INVENTION

1. Field of the Invention

The present invention relates to an image screen having characteristics of high contrast effect and adjusting emitted viewing angle region shape.

2. Description of Related Art

Recently, projector is widely applied in meeting, education, entertainment, and other aspects. Performance of a screen plays an important role in image quality. Because of brightness and contrast, usually it is necessary to lower environment brightness around the screen to view clear and colorful image.

For conventional screen, for example US Patent Publication No. U.S. 2006/0103929, a stack layer composed of a plurality of dielectric layers is provided. The layers with high indexes of refraction and the layers with low indexes of refraction are alternately stacked, such that a portion of light with specific wavelength is reflected. FIG. 1 shows a conventional image screen. Referring to FIG. 1, a screen 10 has a transparent substrate 11. An optical film layer 12 is disposed on two surfaces of the transparent substrate 11. The optical film layer 12 is composed by a plurality of dielectric layers with high index of refraction 12H and a plurality of dielectric layers with low index of refraction 12L which are alternately stacked. The optical film layer 12 reflects light with some wavelength.

Further, a light absorbing layer 14 is disposed on an edge to receive the non-reflected portion of the light, and a light diffusion layer 13 is disposed on the other edge. Image light generated by a display is projected from the light diffusion layer 13 to the screen 10. The optical film layer 12 reflects light with a portion of wavelength. Finally, remaining light is absorbed by the light absorbing layer 14.

In the conventional screen, a same asymmetric film layer 12 is respectively plated on two sides of the substrate 11, and the film layer 12 of each edge reflects wavelengths of red, green, and blue lights, but with a low reflectivity. The same asymmetric stack layer film on two edges can enhance the reflectivity. Materials of high and low (H, L) indices of refraction are dielectric material with large thickness, so a problem of poor adhesive property exists, and the film layer 12 easily breaks, such that it is impossible to be applied to a flexible substrate.

People in the industry still continuously researches and develops other designs of the image screen, so as to improve the performance.

SUMMARY OF THE INVENTION

The present invention provides an image screen, which includes a transparent substrate, a metal film, and an optical reflective stack layer. The metal film is disposed on a first surface of the transparent substrate and has a thickness being predetermined. The optical reflective stack layer is over the metal film. The metal film and the optical reflective stack layer function together to selectively reflect light with a portion of wavelength.

The present invention further provides an image screen, which includes a transparent substrate, and an optical reflective filter stack layer. The optical reflective filter stack layer is disposed on a first surface of the transparent substrate, in which the optical reflective filter stack layer includes at least one metal film, and the optical reflective filter stack layer selectively reflects light with a portion of wavelength.

The present invention still provides an image screen, which includes a transparent substrate, an optical reflective filter stack layer, and a diffusion micro-structure layer. The optical reflective filter stack layer is disposed on a first surface of the transparent substrate, in which the optical reflective filter stack layer selectively reflects the light with a portion of wavelength. The diffusion micro-structure layer is disposed on a second surface of the transparent substrate, such that the light reflected from the optical reflective filter stack layer is emitted with a viewing angle region, in which a micro-structure shape of the diffusion micro-structure layer makes a horizontal width of the viewing angle region be larger than a vertical width thereof.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Usually, a method of enhancing screen contrast mainly includes shielding external light source or absorbing a portion of the spectrum. For example, the present invention adopts a plated film to absorb spectrum of the external environmental light to enhance the image contrast of the projection screen. Therefore, under brighter environment or lower projection brightness, a clear and colorful image is still displayed.

In the present invention, thin film theory is used for redesign to replace at least a portion of dielectric layer in a reflective stack layer of three primary colors of red, green, and blue by at least one metal film. For the light which is also a form of electromagnetic wave, if the thickness is suitable, the metal film still has the function of dielectric film layer, associating with proper selection of material characteristic constants such as extinction coefficient (k) and index of refraction (n). In the following, some embodiments are described to illustrate the present invention, but the present invention is not limited to the described embodiments. Further, the described embodiments can also be partly combined properly, and it is not limited by individual embodiments.

Figure 1:
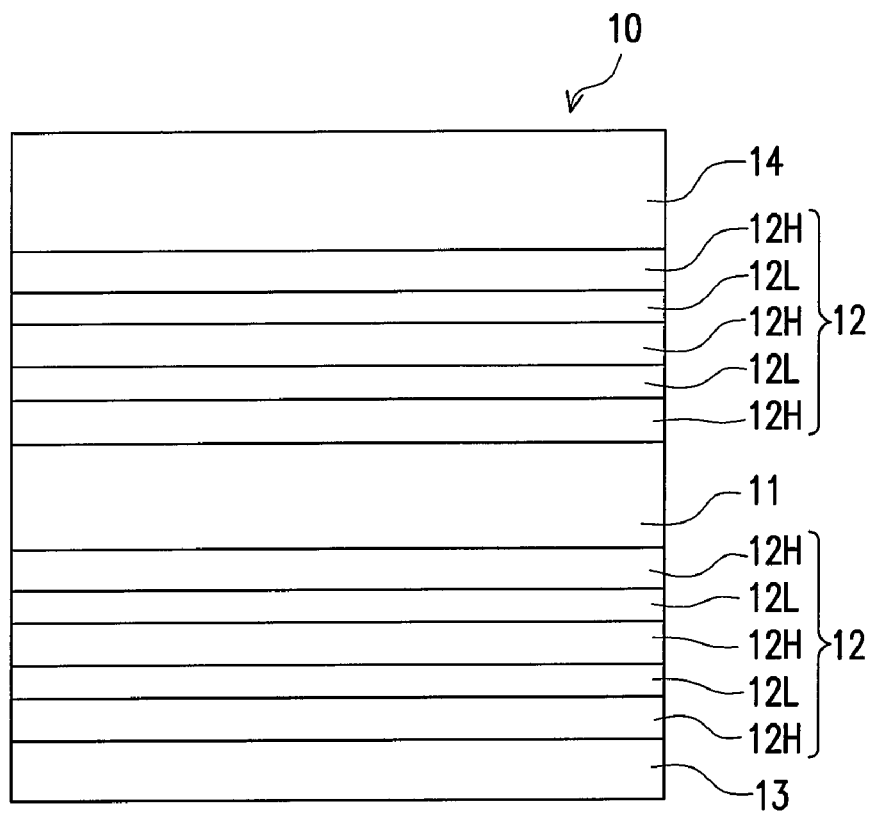
FIG. 1 shows a conventional image screen.
Figure 2:
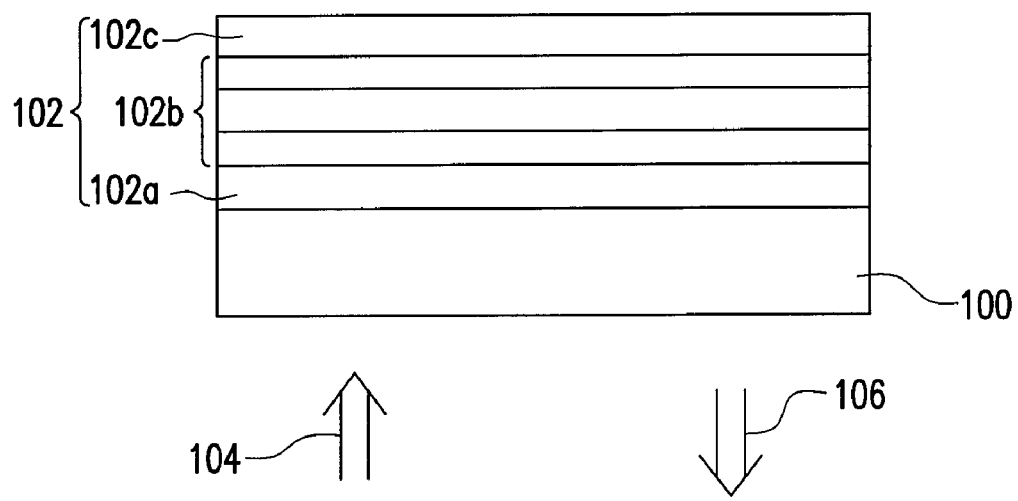
FIG. 2 is a schematic cross-sectional view of an image screen according to an embodiment of the present invention.

FIG. 2 is a schematic cross-sectional view of an image screen according to an embodiment of the present invention. Referring to FIG. 2, the image screen includes a transparent substrate 100. The transparent substrate 100 can be made of flexible material, such as plastic, which is not limited by plane display. However, the transparent substrate 100 can also be made of hard material, such as glass.

Next, an optical reflective filter stack layer 102 is disposed on a surface of the substrate 100. The optical reflective filter stack layer 102 includes, for example, at least one metal film 102a and an optical reflective stack layer 102b. The optical reflective filter stack layer 102 can further includes, for example, a reflective layer 102c or a light absorbing layer 102c.

The metal film 102a is disposed, for example, on a surface of the substrate 100, and has a thickness being predetermined. The metal film 102 in operation with the optical reflective stack layer 102b has functions of light reflection, absorption, and filtering, in addition, the metal film 102 can also provide adhesive property between the substrate 100 and the optical reflective stack layer 102b. Generally, the optical reflective stack layer 102b is made of dielectric material, the adhesive property with the substrate 100 is weaker, and after enhancing the adhesive property through the metal film 102a, the optical reflective stack layer 102b is more suitable for substrate with the flexible material.

The optical reflective stack layer 102b is disposed, for example, over the metal film 102a. The metal film 102a and the optical reflective stack layer 102b function together to selectively reflect the light with a portion of wavelength, for example, to reflect red, green, or blue lights and to absorb the light with other wavelength.

Here, the metal film 102a between the substrate 100 and the optical reflective stack layer 102b can enhance the adhesive property. However, the manner is not a unique manner. Generally, the optical reflective filter stack layer 102 includes at least one metal film, but the position of the at least one metal film in the stack layer structure is not limited.

An incident light 104 is incident from the substrate 100, and a portion of wavelength range in the light is reflected by the optical reflective filter stack layer 102 to become a reflected image light 106. The optical reflective filter stack layer 102 absorbs the light with other wavelength, so it also has the filtering function, for example reflecting the red, green, or blue light more purely, so as to enhance the image contrast.

For the material of the optical reflective filter stack layer 102, the optical reflective stack layer 102b includes, for example, a plurality of alternately stacked dielectric stack layers having high indexes of refraction and low indexes of refraction. The material of the dielectric stack layer includes, for example, $Ta_2O_5$, $TiO_2$, $Nb_2O_5$, $Al_2O_3$, $MgF_2$, or $SiO_2$. The indexes of refraction of the dielectric stack layers are substantially between 1.35 and 2.45. The material of the metal film 102a includes, for example, Ag, Al, Au, Cr, Ir, Ni, Pt, Re, Ta, Ti, or W. In addition, the thickness of each stack layer is, for example, substantially within a scope between 2.5 nm and 200 nm. The method of forming the film layer is, for example, evaporation.

The optical mechanism of the metal film of the present invention is described below. The image is usually composed of three primary colors of red, green, and blue respectively having their own reflectivity. However, the image light reflected by the screen may have a certain degree of environmental background light signal.

Figure 3:
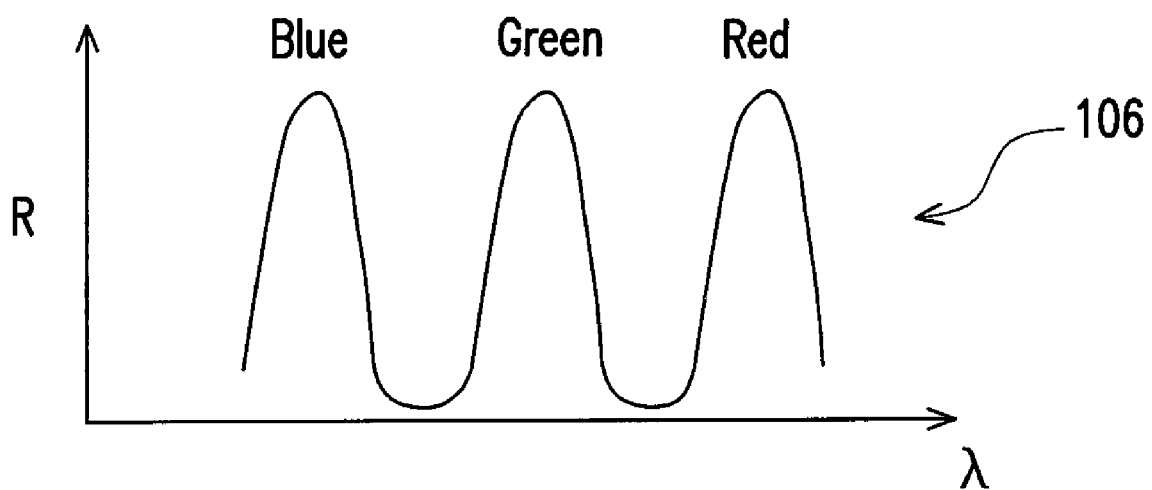
FIG. 3 is a schematic view of an image light reflected from the screen according to the embodiment of the present invention.

In the present invention, for example, the environmental light is effectively lowered with the metal film together with the thickness adjustment of the dielectric stack layer. FIG. 3 is a schematic view of an image light reflected from the screen according to the embodiment of the present invention. Referring to FIG. 3, a longitudinal axis represents reflectivity R, and a horizontal axis represents light wavelength. The reflected image light 106 has purer red, green, and blue lights, and the environmental background light signal can be effectively reduced, such that the image contrast can be improved.

Figure 4:
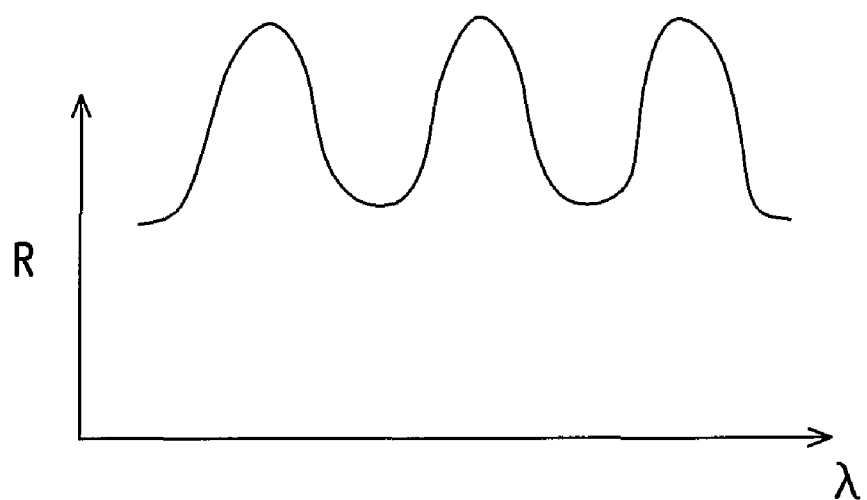
FIG. 4 is a schematic view of an image light reflected from the screen, when thickness of the metal film is too thin, according to the embodiment of the present invention.
Figure 5:
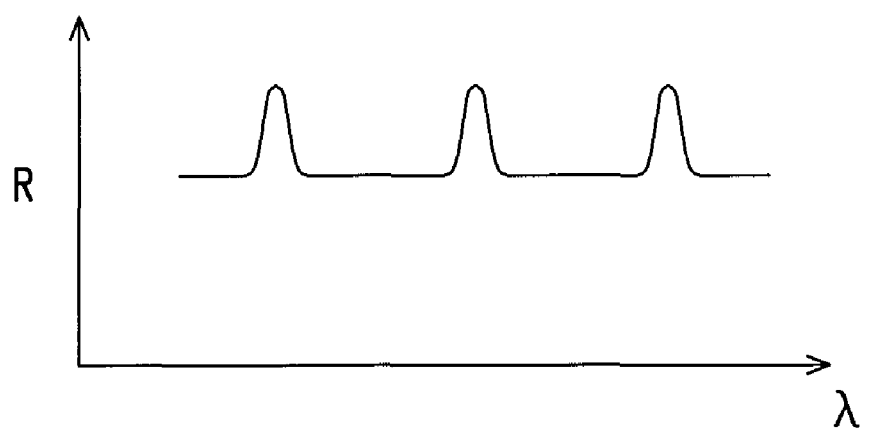
FIG. 5 is a schematic view of an image light reflected from the screen, when thickness of the metal film is too thick, according to the embodiment of the present invention.

The thickness of the metal film must be designed at a proper thickness. If the thickness of the metal film is small, selecting efficiency of the reflected light is reduced. FIG. 4 is a schematic view of an image light reflected from the screen, when thickness of the metal film is too thin, according to the embodiment of the present invention. Referring to FIG. 4, although red, blue, and green lights can be effectively reflected, the background light signal is large, so the contrast is still not enough. FIG. 5 is a schematic view of an image light reflected from the screen, when thickness of the metal film is too thick, according to the embodiment of the present invention. Referring to FIG. 5, on the contrary, when the thickness of the metal film is too large, although purer red, green, and blue lights can be obtained, the reflectivity is too low, so it is not an effective design. In other words, for example after considering the extinction coefficient (k) and the index of refraction (n) of the metal film material, proper thickness is adopted to make the reflected light have preferred contrast and to increase color vividness.

Figure 6:
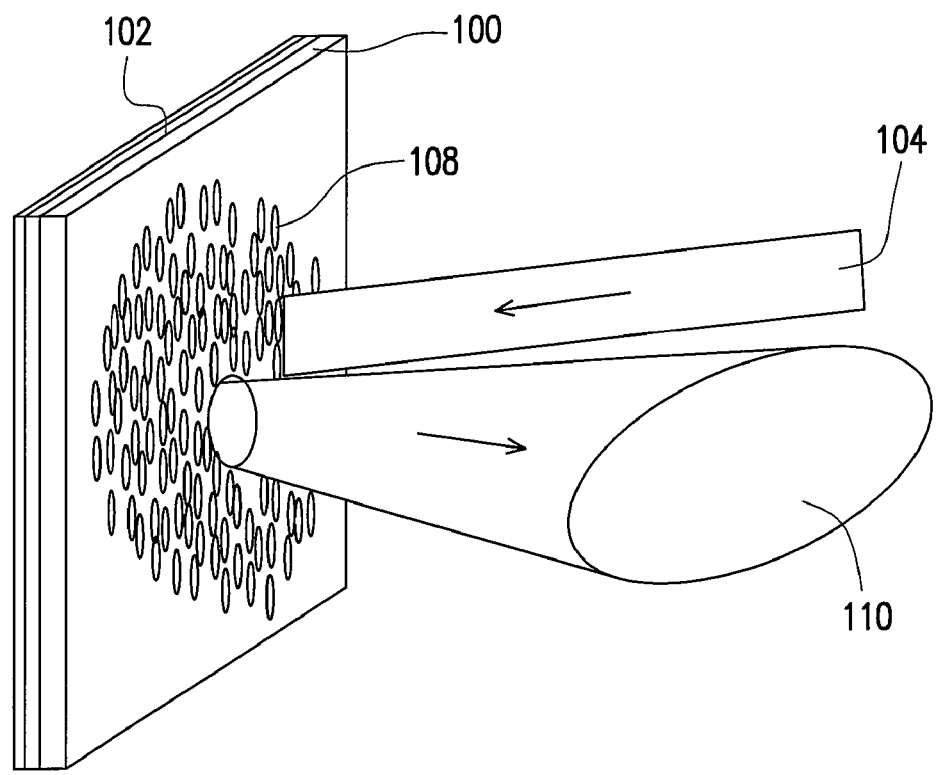
FIG. 6 is a schematic structural perspective view of the image screen according to the embodiment of the present invention.

Next, a micro-structure layer can be further formed on the other surface of the substrate 100 of the present invention, so as to control viewing angle scope of emerging light. FIG. 6 is a schematic structural perspective view of the image screen according to the embodiment of the present invention. Referring to FIG. 6, a micro-structure layer 108 is disposed on the other surface of the substrate 100, and the micro-structure layer 108 is, for example, directly formed on the surface of the substrate 100, or is disposed on the substrate 100 after being fabricated. The micro-structure layer 108 can include a plurality of micro-structures having designed shapes. When the incident light 104 is incident, the image has a viewing angle scope under the function of the micro-structure layer 108, so audience before the screen can view the image on the screen at different viewing angles.

The functions of the micro-structure layer 108 of the present invention include controlling the viewing angle scope to make the horizontal width of a light emerging region 110 be larger than the vertical width. Such a design is base on the consideration of practical using. Generally, the viewers are approximately distributed on a position at the same horizontal height, so larger horizontal viewing angle scope is required instead of a larger vertical viewing angle scope. Therefore, in the present invention, emerging lights can be focused to improve the display light intensity.

Figure 7:
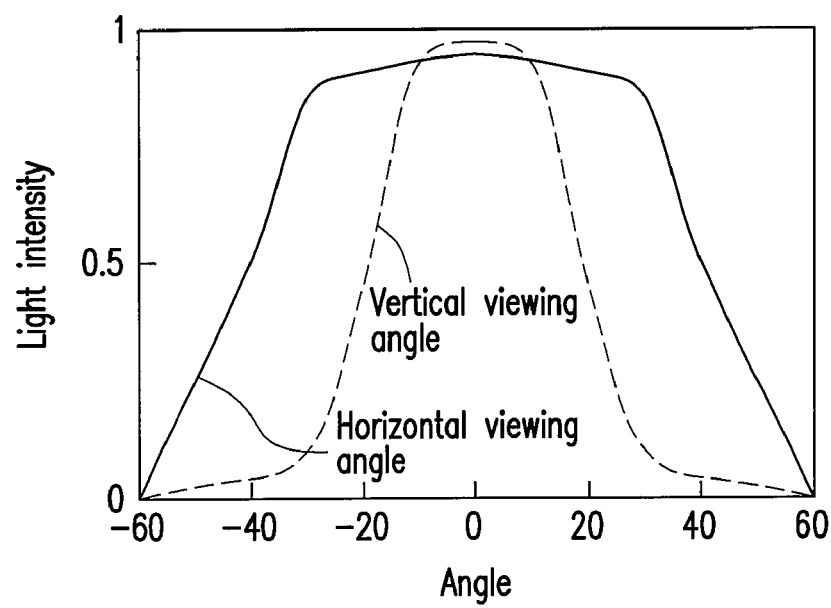
FIG. 7 is a schematic view of the viewing angle scope according to the embodiment of the present invention.

FIG. 7 is a schematic view of the viewing angle scope according to the embodiment of the present invention. Referring to FIG. 7, the viewing angle is defined as angle of viewing the screen, with the viewing angle at the direction when front viewing the screen being zero degree as a reference. Through the micro-structure design, the horizontal viewing angle at the horizontal direction can be controlled within, for example, a diffusion scope of viewing angle of ±30 degrees, for a plurality of users to view. At the same time, the positions of the users are not quite different on height, so the vertical viewing angle of the vertical direction can be controlled within, for example, a diffusion scope of viewing angle of ±15 degrees. Therefore, the light intensity can be relatively gathered. In other words, in the embodiment of the present invention, the micro-structure is used to make the horizontal width of the light emerging region 110 be larger than the vertical width thereof.

Generally, according to the image screen of an embodiment, the optical reflective stack layer can include, for example, a plurality of alternately stacked dielectric stack layers having high indexes of refraction and low indexes of refraction.

In the image screen according to an embodiment, the material of the dielectric stack layer includes, for example, $Ta_2O_5$, $TiO_2$, $Nb_2O_5$, $Al_2O_3$, $MgF_2$, or $SiO_2$. Further, for example, the indexes of refraction of the dielectric stack layers are substantially between 1.35 and 2.45.

In the image screen according to an embodiment, the reference parameter of the metal film includes, for example, thickness, extinction coefficient (k), and index of refraction (n) being predetermined.

In the image screen according to an embodiment, for example the selectively reflected wavelength includes wavelength sections of red light, green light, and blue light.

In the image screen according to an embodiment, for example the metal film and the optical reflective stack layer function together to selectively absorb an environmental light.

In the image screen according to an embodiment, the screen further includes, for example, a reflective layer disposed on an edge of the optical reflective stack layer and opposite to the transparent substrate.

In the image screen according to an embodiment, the screen further includes, for example, a light absorbing layer disposed on an edge of the optical reflective stack layer and opposite to the transparent substrate.

In the image screen according to an embodiment, the material of the metal film includes, for example, Ag, Al, Au, Cr, Ir, Ni, Pt, Re, Ta, Ti, or W.

In the image screen according to an embodiment, the screen further includes, for example, a diffusion micro-structure layer disposed on a second surface of the transparent substrate and opposite to the metal film.

In the image screen according to an embodiment, for example the viewing angle region of the reflected image light is made to have a horizontal width be larger than a vertical width.

The plurality of embodiments described in the present invention can be combined properly to achieve the required product, and it is not necessary to limit to a single embodiment.

In this embodiment of the present invention, an ultra thin metal film is used as a combining layer between a flexible substrate and a subsequent optical stack layer, so as to enhance the adhesive property, and to show the optical property of the subsequent optical stack layer at the same time.

After the dielectric material stack film, for example, a high reflective metal film or an optical absorbing layer is further disposed, and all the stack films can be plated on the same side of the substrate, so as to greatly reduce the process time.

The metal film can greatly reduce the number of dielectric layers of the screen and the stress of the whole stack layer film, so as to increase elasticity and flexibility of the stack layer film. Therefore, the stack layer film can be plated on the flexible substrate.

Further, various surface micro-structure processing can be performed on the other side of the substrate according to different purposes, so as to control the screen viewing angle.

During using, because the stack layer film is fabricated on the back of the substrate, so it is hardly affected by the environment, for example, it can be usually cleaned and wiped without resulting in scraping or falling.

The present invention at least includes the above characteristics, but it is not limited to the listed characteristics.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image screen, comprising:
   a transparent substrate;
   a metal film, disposed on a first surface of the transparent substrate with direct contact, having a thickness being predetermined; and
   a dielectric stack layer, disposed over the metal film,
   wherein the metal film and the dielectric stack layer function together to selectively reflect a light with a portion of wavelength for red, green and blue lights in substantial separation,
   wherein the light is incident on the screen in a sequence consisting of the transparent substrate, the metal film and the dielectric stack layer.

2. The image screen as claimed in claim 1, wherein the dielectric stack layer comprises a plurality of dielectric layers having high index of refraction and low index of refraction and stacked alternatively.

3. The image screen as claimed in claim 2, wherein materials of the dielectric layers comprises $Ta_2O_5$, $TiO_2$, $Nb_2O_5$, $Al_2O_3$, $MgF_2$, or $SiO_2$.

4. The image screen as claimed in claim 2, wherein indexes of refraction of the dielectric layers are substantially between 1.35 and 2.45.

5. The image screen as claimed in claim 1, wherein the metal film with the dielectric stack layer in operation to selectively absorb a portion light with a wavelength range.

6. The image screen as claimed in claim 1, wherein the metal film and the dielectric stack layer function together to selectively absorb a portion of light with a wavelength range other than red, green, and blue.

7. The image screen as claimed in claim 1, wherein a material of the metal film comprises Ag, Al, Au, Cr, Ir, Ni, Pt, Re, Ta, Ti, or W.

8. An image screen, comprising:
   a transparent substrate;
   a metal film, disposed on a first surface of the transparent substrate with direct contact, having a thickness being predetermined;
   a dielectric stack layer, disposed over the metal film; and
   a reflective layer disposed on an edge of the dielectric stack layer and opposite to the transparent substrate, wherein the metal film and the dielectric stack layer function together to selectively reflect a light with a portion of wavelength for red, green and blue lights in substantial separation, wherein the light is incident on the screen in a sequence consisting of the transparent substrate, the metal film, the dielectric stack layer and the reflective layer.

9. An image screen, comprising:

a transparent substrate;

a metal film, disposed on a first surface of the transparent substrate with direct contact, having a thickness being predetermined;

a dielectric stack layer, disposed over the metal film; and a light absorbing layer disposed on an edge of the dielectric stack layer and opposite to the transparent substrate, wherein the metal film and the dielectric stack layer function together to selectively reflect a light with a portion of wavelength for red, green and blue lights in substantial separation, wherein the light is incident on the screen in a sequence consisting of the transparent substrate, the metal film, the dielectric stack layer and the light absorbing layer.

10. An image screen, comprising:

a transparent substrate;

a metal film, disposed on a first surface of the transparent substrate with direct contact, having a thickness being predetermined;

a diffusion micro-structure layer, disposed on a second surface of the transparent substrate and opposite to the metal film; and a dielectric stack layer, disposed over the metal film, wherein the metal film and the dielectric stack layer function together to selectively reflect a light with a portion of wavelength for red, green and blue lights in substantial separation, wherein the light is incident on the screen in a sequence consisting of the diffusion micro-structure layer, the transparent substrate, the metal film and the dielectric stack layer.

11. An image screen, comprising:

a transparent substrate; and an optical reflective filter stack layer, disposed on a first surface of the transparent substrate, wherein the optical reflective filter stack layer comprises at least one metal film having predetermined thickness according to material constants of an extinction coefficient (k) and an index of refraction (n), and the optical reflective filter stack layer selectively reflects a light with a portion of wavelength, wherein the selectively reflected light with the portion of wavelength is red, green, and blue lights in substantial separation, wherein the at least one metal film comprises one metal film disposed on the transparent substrate with direct contact.

12. The image screen as claimed in claim 11, wherein the optical reflective filter stack layer absorbs at least a portion of the unreflected light.

13. The image screen as claimed in claim 11, wherein the optical reflective filter stack layer further comprises a plurality of stacked dielectric layers with a plurality of indexes of refraction.

14. The image screen as claimed in claim 13, wherein the indexes of refraction are substantially between 1.35 and 2.45.

15. The image screen as claimed in claim 11, further comprising:

a diffusion micro-structure layer, disposed on a second surface of the transparent substrate opposite to the optical reflective filter stack layer, such that the light reflected from the dielectric stack layer emits with a viewing angle region, wherein a micro-structure shape of the diffusion micro-structure layer makes a horizontal width of the viewing angle region larger than a vertical width thereof.

16. The image screen as claimed in claim 15, wherein the dielectric stack layer further comprises a plurality of dielectric layers with a plurality of indexes of refraction.

17. The image screen as claimed in claim 16, wherein the indexes of refraction are substantially between 1.35 and 2.45.

18. The image screen as claimed in claim 15, wherein the light is incident on the screen in a sequence of the transparent substrate and the dielectric stack layer.

19. The image screen as claimed in claim 18, wherein the light is incident on the image screen with a sequence of the diffusion micro-structure layer, the transparent substrate and the dielectric stack layer.

20. The image screen as claimed in claim 11, wherein the light is incident on the screen in a sequence of the transparent substrate and the dielectric stack layer.

* * * * *